United States Patent
Saito et al.

[11] Patent Number: 5,815,772
[45] Date of Patent: Sep. 29, 1998

[54] DRIVING SYSTEM FOR A DETACHABLE UNIT AND OF USING SAME

[75] Inventors: Naomasa Saito, Toyokawa; Toshimitsu Shimizu, Toyohashi; Taira Suzuki, Toyokawa, all of Japan

[73] Assignee: Minolta Co., Ltd., Osaka, Japan

[21] Appl. No.: 745,188

[22] Filed: Nov. 7, 1996

[30] Foreign Application Priority Data

Nov. 13, 1995 [JP] Japan .................................. 7-294314

[51] Int. Cl.⁶ .................................................. G03G 21/00
[52] U.S. Cl. ........................................... 399/107; 399/401
[58] Field of Search .................................. 399/167, 401, 399/107, 110; 271/301, 3.19, 3.2

[56] References Cited

U.S. PATENT DOCUMENTS

| | | | |
|---|---|---|---|
| 4,433,905 | 2/1984 | Haramaki et al. | 399/110 |
| 4,780,745 | 10/1988 | Kodama | 399/401 |
| 4,956,678 | 9/1990 | Kiya et al. | 399/401 |
| 5,003,355 | 3/1991 | Tanzawa | 399/401 |
| 5,049,946 | 9/1991 | Harada | 399/110 |
| 5,485,990 | 1/1996 | Kato | 271/9.08 |
| 5,615,872 | 4/1997 | Mochimaru | 271/301 |

FOREIGN PATENT DOCUMENTS

| | | |
|---|---|---|
| 5-16438 | 1/1993 | Japan . |
| 5-24746 | 2/1993 | Japan . |
| 5-289447 | 11/1993 | Japan . |
| 6-15896 | 1/1994 | Japan . |

*Primary Examiner*—Nestor R. Ramirez
*Attorney, Agent, or Firm*—Burns, Doane, Swecker & Mathis, LLP

[57] ABSTRACT

An image processing system includes a main image processing unit and an auxiliary unit detachably attached to the main image processing unit. The auxiliary unit includes a first drive source. The main unit on the other hand includes a second drive source and a mechanism for transporting a sheet. These drive sources are so operated that when the auxiliary unit is attached to the main unit the transporting mechanism is powered by the first drive source in the auxiliary unit and when the auxiliary unit is not attached to the main unit the transporting mechanism is powered by the second drive source in the main unit.

19 Claims, 11 Drawing Sheets

DRIVING SYSTEM FOR A DETACHABLE UNIT AND OF USING SAME

FIELD OF THE INVENTION

The invention relates to an image processing system which is a combination of a main unit capable of carrying out a primary function of the system and an auxiliary unit detachable to the main unit and capable of providing the main unit with an additional function once attached to the main unit. The combination may include, for example, a copier and a sorter, a copier and an automated document feeder, or an image reader and an automated document feeder. Also, the invention relates to an image forming method using such system.

BACKGROUND OF THE INVENTION

There is known an image processing apparatus capable of solely executing an image forming function, but capable of being expanded to execute an additional or auxiliary function when combined with an auxiliary unit, that is, when an auxiliary unit is detachably coupled with the image processing apparatus. Such a combination includes, for example, a printer (or copier) and a detachable automatic document feeder, a printer (or copier) and a detachable sorter, a printer (or copier) and a detachable image reader, and so on.

In such known system the image processing apparatus generally comprises not only primary component parts necessary to perform the primary function, but also some of auxiliary component parts which, when the auxiliary unit is coupled therewith, perform the auxiliary function in cooperation with some or all of the primary component parts. By way of example, a printing system is known which comprises a printer capable of making a print only on one side of a sheet member and a detachable auxiliary unit capable of permitting the printer to have an additional function to make the same or a different print on the opposite side of the same sheet member.

The image processing apparatus when combined with the auxiliary unit is indeed attractive in that the user can enjoy not only the feature afforded solely by the image processing apparatus, but also the feature afforded by the combined image processing apparatus and auxiliary unit. However, the auxiliary unit itself is good for nothing unless it is coupled with the image processing apparatus because, for example, a drive motor for providing a drive necessary to bring the auxiliary component part into motion is incorporated in the image processing apparatus.

In such known system, the drive motor employed in the image processing apparatus is of a reversible type having its performance and operating characteristics both determined in consideration of the possible use of the auxiliary unit. Where the single drive motor is employed concurrently for the image processing apparatus and the auxiliary unit, such drive motor must have a high torque, a relatively high durability and a high load withstanding capacity.

Whereas such system is attractive to those who wish to have an apparatus having expanded functions, such system would be expensive and good for nothing to those who do not wish to have an apparatus having expanded functions.

SUMMARY OF THE INVENTION

Accordingly, the primary object of the instant invention is to provide an improved image processing system, comprising of a main image processing and an auxiliary unit detachable to the main unit, which permits the main unit to include a minimized, but required number of component parts for carrying out an additional function that is accomplished in combination with the auxiliary unit.

To achieve the foregoing and other objects and advantages, the auxiliary unit includes a first drive source. The main unit on the other hand includes a second drive source and a mechanism for transporting a sheet. These drive sources are so operated that when the auxiliary unit is attached to the main unit the transporting mechanism is powered by the first drive source in the auxiliary unit and when the auxiliary unit is not attached to the main unit the transporting mechanism is powered by the second drive source in the main unit.

With the instant invention, the main unit is permitted to include the least parts having capability and performance sufficient for carrying out its primary function.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

PREFERRED EMBODIMENT OF THE INVENTION

(1) Construction of System

Figure 1:
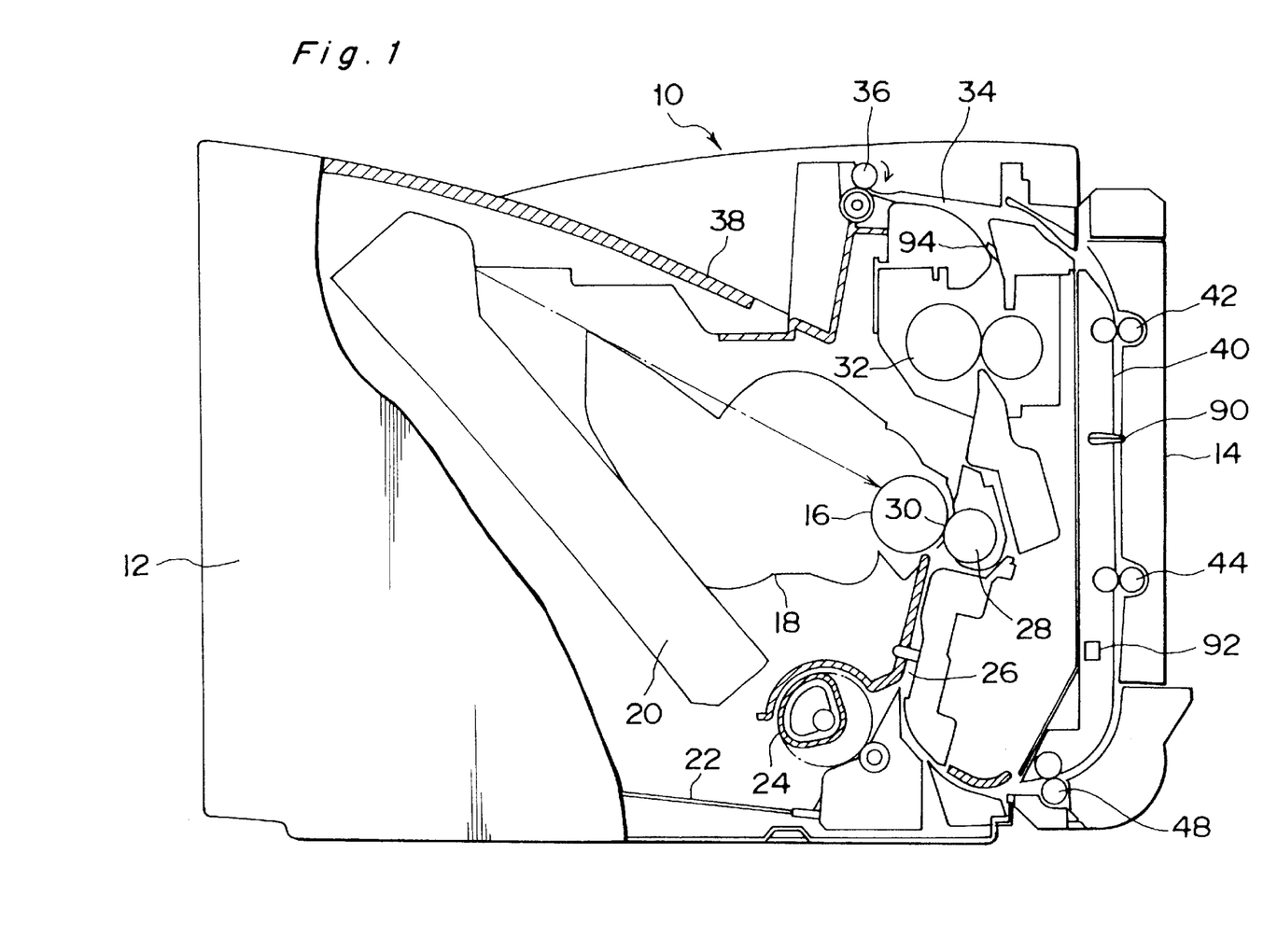
FIG. 1 is a cut-away side elevational view of a printing system of the invention.

With reference to the drawings, a preferred embodiment of the instant invention will be described. FIG. 1 depicts a printing system 10 according to the invention. The system 10 generally comprises a main unit 12 which includes essential parts required to carry out an electrophotographic image forming process and an auxiliary unit detachably attached to the main unit 10 so as to provide the main unit 10 with an expanded function. In the illustrated instance, the auxiliary unit is an auxiliary unit 14, hereinafter referred to as a duplex printing unit, which when attached to the main unit 10 renders the main unit 10 as a whole to have a duplex printing capability. In other words, while the main unit 10 has a capability of making a print on one of the opposite sides of a sheet member, the duplex printing unit 14 has a capability of permitting the main unit 10 to make the same or a different print on the other of the opposite sides of the sheet member.

The main unit 12 is shown as having the duplex printing unit 14 attached thereto and includes at least a photoconductive drum 16, a developer, and a charger. In operation, an outer surface of the photoconductive drum 16 is uniformly charged by the charger. The charged surface portion of the photoconductive drum 18 is then illuminated with a laser beam emitted from a laser emitting device 20 according to a print information so that an electrostatic latent image corresponding to the print information can be formed on the drum 16. This electrostatic latent image is subsequently developed by the developer into a visual toner image.

A sheet member, for example, a copying paper stocked on a tray 22 is fed by a paper feed roller 24 through a passage. 26 towards a transfer station 30 where the photoconductive drum 16 faces the transfer unit 28. At this transfer station 30, the toner image is transferred onto the copying paper, and the copying paper bearing the transferred toner image is then advanced to a fixing station where the toner image is fused by a fixing roller 32 to fix on the copying paper.

At this time, if a single printing mode for printing an image on one side of the copying paper is selected, the paper is then discharged through the passage 34 to a catch tray 38 by a discharge roller 36.

Contrary to this, if a duplex printing mode for printing respective images on opposite sides of the copying paper is selected, the copying paper ready to move past the passage 34 is halted shortly before a rear end of the copying paper reaches the discharge roller 36. After a short time, the discharge roller 36 rotatable in both of first and second directions opposite to each other start rotating in the second direction opposite to the first direction so that the copying paper ready to leave the passage 34 can be fed backwardly into a passage 40 formed in the duplex printing unit 14.

The copying paper entering the passage 40 is then fed downwardly by transportation rollers 42 and 44 towards a timing roller 48 which then feeds the copying paper again into the passage 26 and then to the transfer station 30 where a next toner image formed likewise on the photoconductive drum 18 is transferred onto the opposite side of the copying paper. The copying paper is then advanced to the fixing station where the newly transferred toner image is fixed on the paper. After having moved past the fixing station, the copying paper is finally discharged through the passage 34 onto the catch tray 38 by the discharge roller 36.

Figure 2:
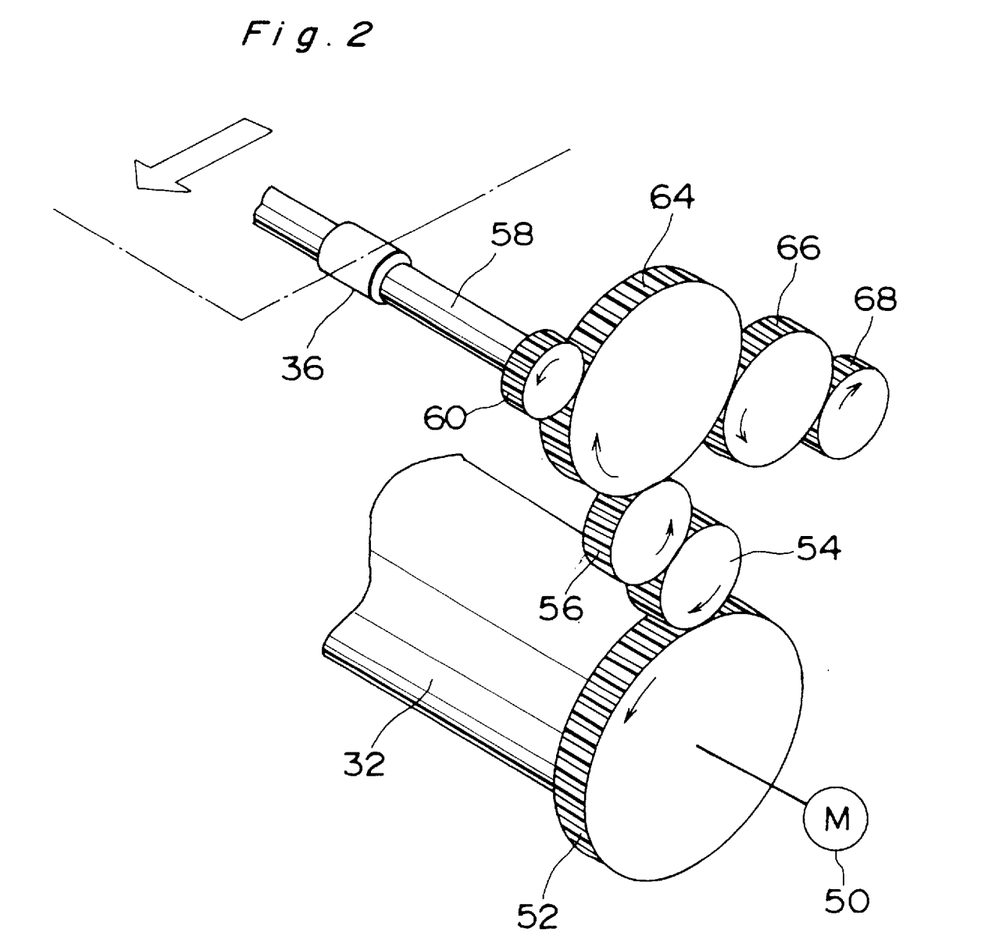
FIG. 2 is a perspective view of a mechanism which transmits a rotation from a drive source in a main unit to a discharge roller.
Figure 3:
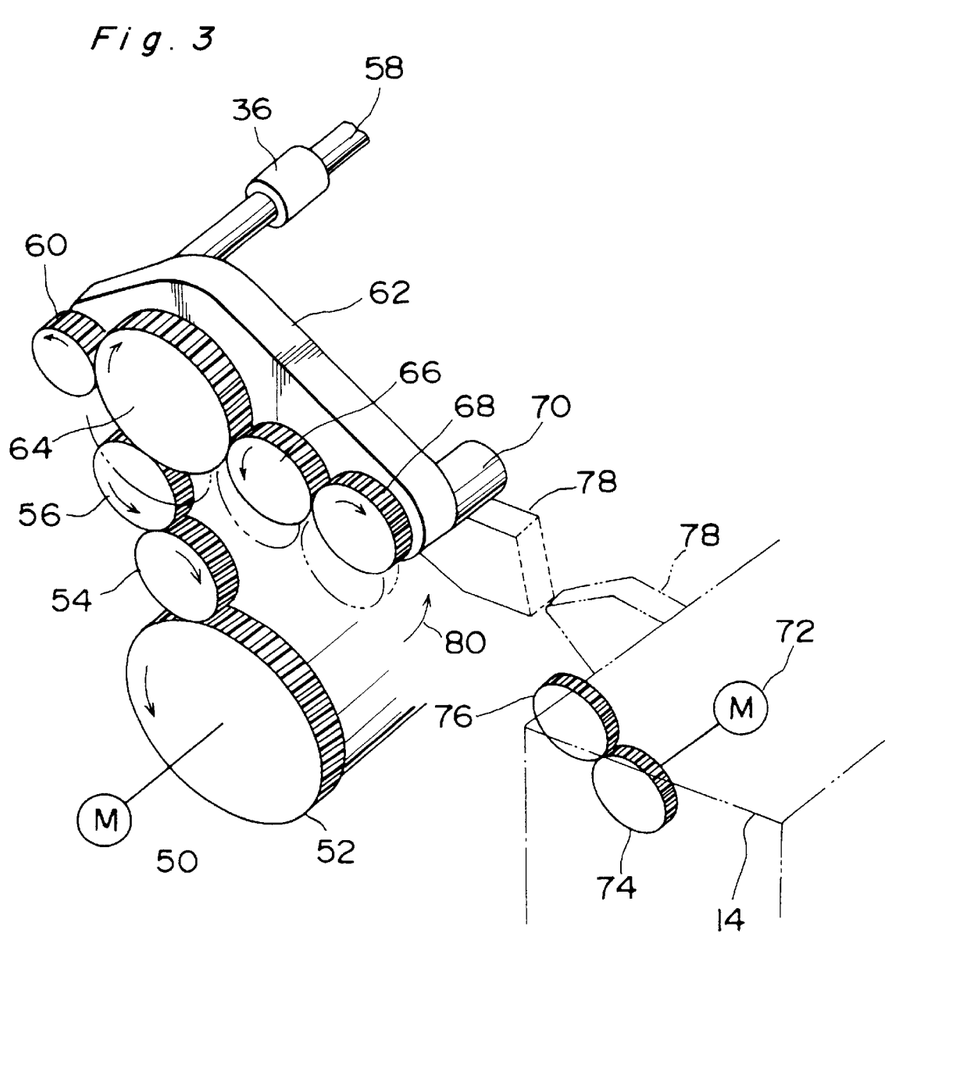
FIG. 3 is a perspective view of a mechanism which transmits a rotation from a drive source in a duplex printing unit to the discharge roller in the main unit.

Discussion will be made to a paper transporting mechanism which is commonly used by both the main unit 12 and the duplex printing unit 14. As shown in FIGS. 2 and 3, the main unit 12 includes a main motor 50 drivingly connected to a fixer gear 52 fixed on the fixing roller 32. The fixer gear 52 is engaged with a gear 54 which is in turn meshed with another gear 56 so that rotation of the fixer gear 52 can be transmitted through the gear 54 to the gear 56 to drive the latter in a direction conforming to the direction of rotation of the fixer gear 52 as shown by respective arrows.

The discharge roller 36 has a shaft 58 on which a fixed gear 60 and a rotatable idle lever 62 are fixedly mounted. The idle lever 62 has on its one side a plurality of rotatable gears 64, 66, and 68. These three gears 64, 66, and 68 are meshed in series with each other, and the gear 64 is engaged also with the gear 60 on the discharge roller 36. The idle lever 62 also has on its opposite side a protrusion 70.

With this arrangement, when the duplex printing unit 14 is not attached to the main unit 12, the gear 56 is engaged with the gear 64 so that the rotation of the main motor 50 can be transmitted through the gears 52, 54, 56, and 64 to the gear 60 on the discharge roller 36 as shown in FIG. 2.

As shown in FIG. 3, the duplex printing unit 14 includes a reversible drive motor 72 capable of rotating selectively in one of the first and second directions opposite to each other. The drive motor 72 is drivingly connected with a gear 74 which is in turn engaged with a gear 76 so that rotation of the drive motor 72 can be transmitted through the gear 74 to the gear 76. Also, the duplex printing unit 14 has a fixed engagement bar 78.

Figure 4:
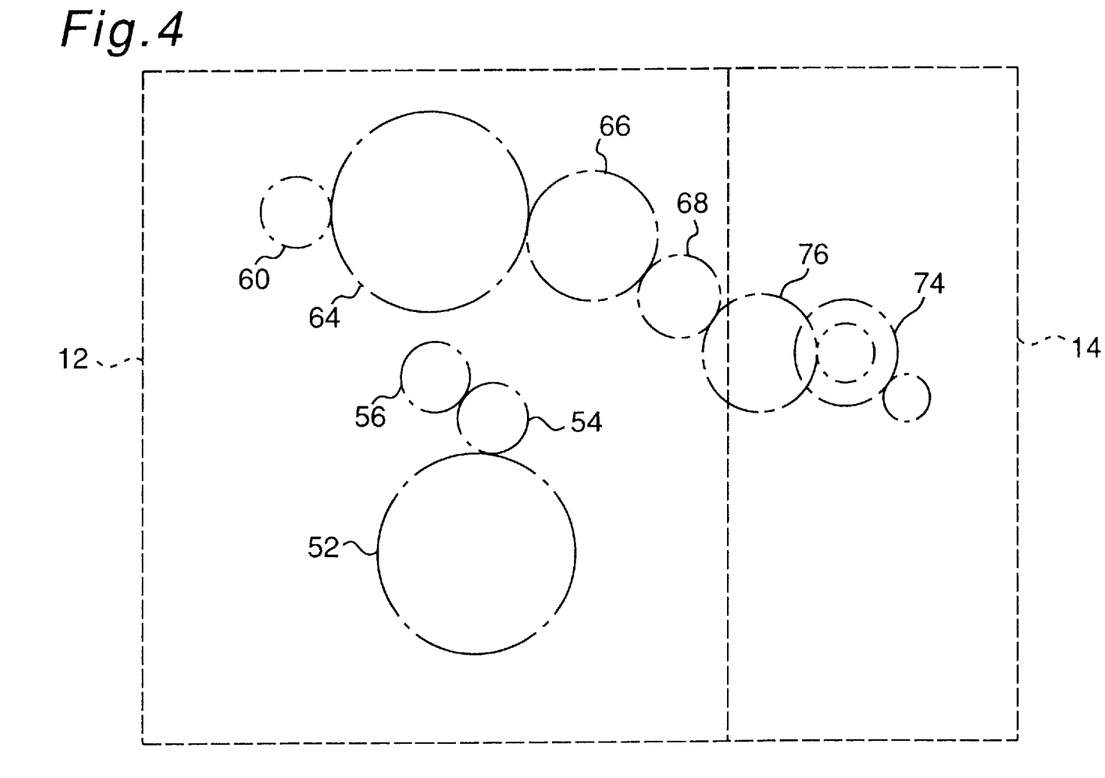
FIG. 4 is a side elevational view of the mechanism shown in FIG. 3, in which a drive source in the duplex printing unit is connected through various gears with the discharge roller in the main unit.
Figure 5:
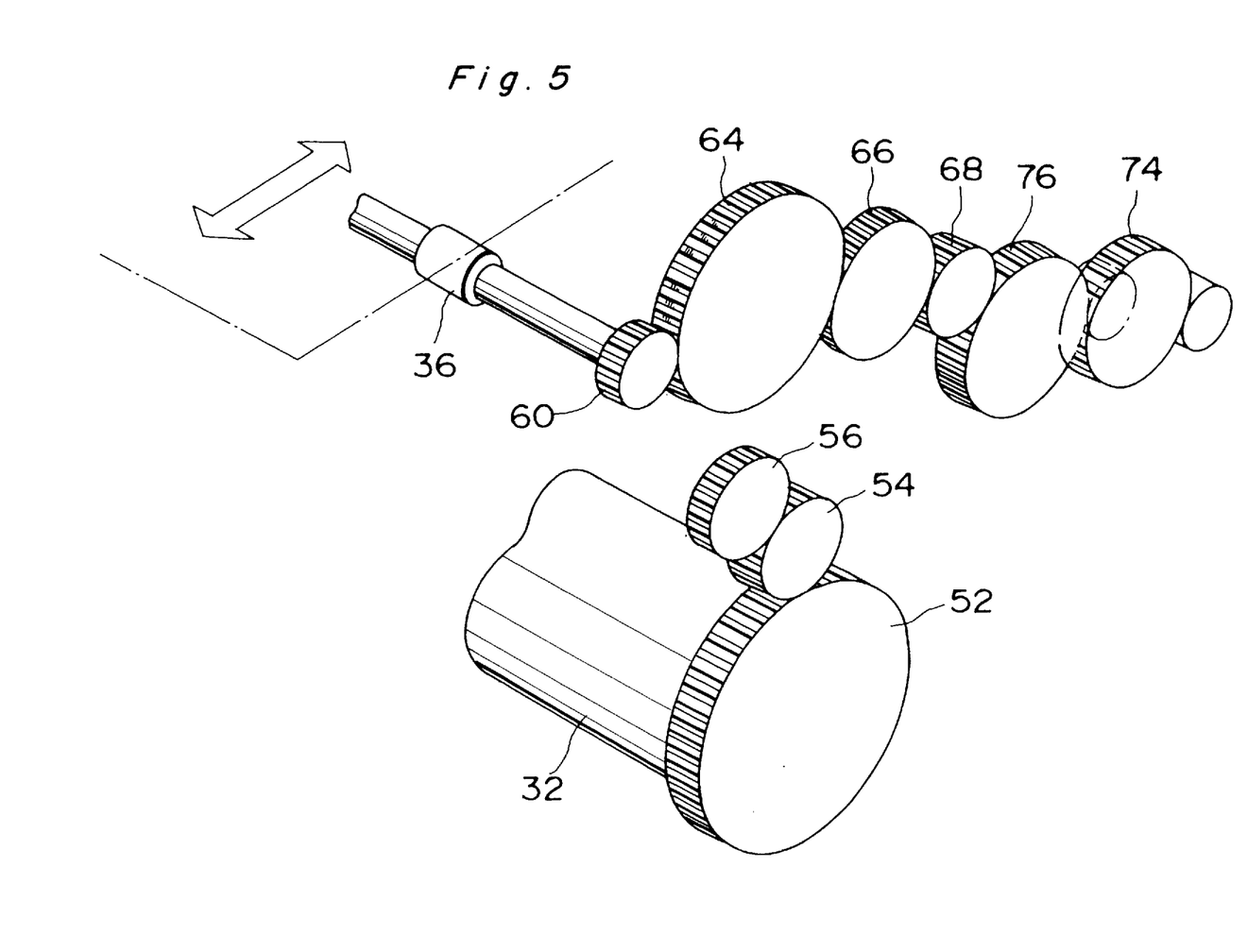
FIG. 5 is a perspective view corresponding to FIG. 4 which shows the connection between the drive source in the duplex printing unit and the discharge roller in the main unit.

When the duplex printing unit 14 is attached to the main unit 12, the engagement bar 78 is brought into contact with the protrusion 70 to rotate the idle lever 62 in a direction shown by the arrow 80 in FIG. 3. As a result, as shown in FIGS. 4 and 5, the gear 56 is disengaged from the gear 64 and no drive of the drive motor 50 is transmitted to the gear 60. Instead, the gear 76 of the duplex printing unit 14 is brought into engagement with the gear 68 of the main unit 12 so that rotation of the discharge motor 72 capable of rotating selectively in one of first and second directions opposite to each other is transmitted through gears 74, 76, 68, 66, 64 and 60 to the discharge roller 36. Note that the transportation rollers 42 and 44 and timing roller 48 are drivingly connected with a motor 82 shown in FIG. 6.

Figure 6:
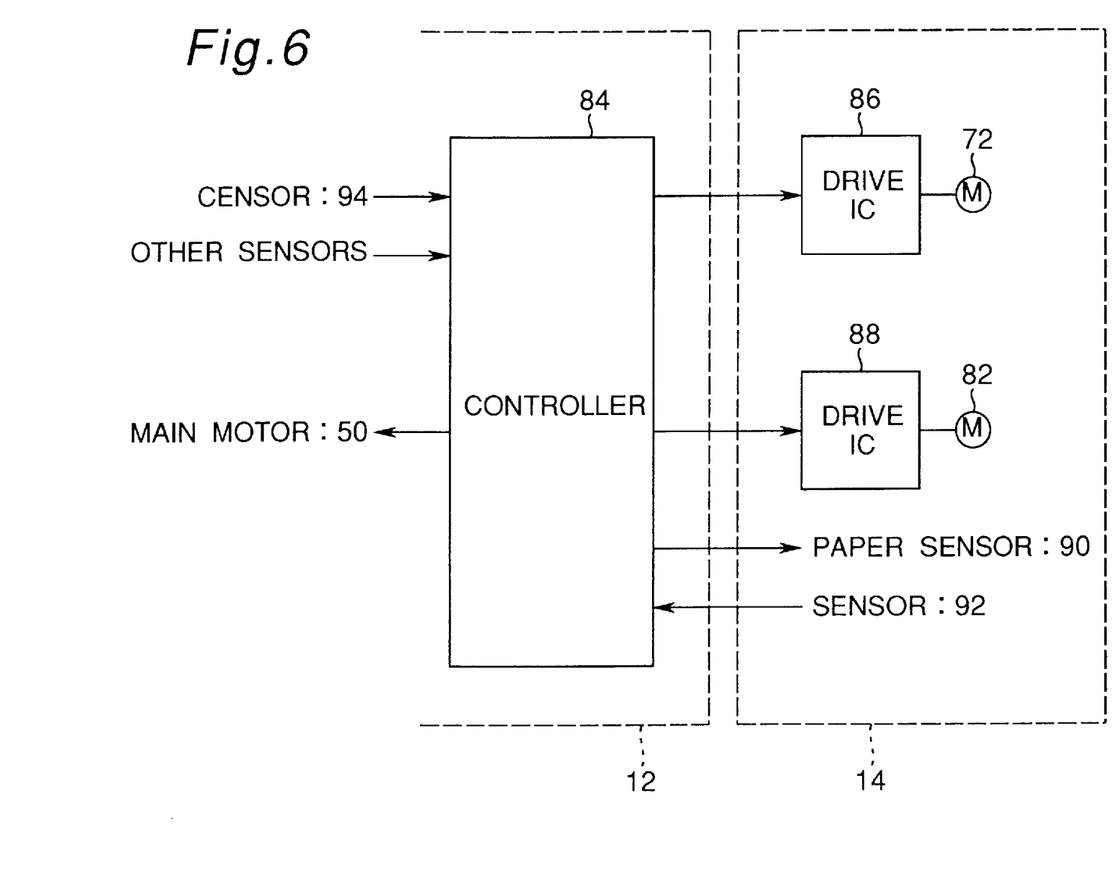
FIG. 6 is a circuit diagram of the main unit and the duplex printing unit connected with the main unit.

The main unit 12 is electrically connected with the duplex printing unit 14 once the duplex printing unit 14 is attached to the main unit 12. Specifically, as shown in FIG. 6, a controller 84 in the main unit 12 is electrically connected with drive ICs 86 and 88 in the duplex printing unit 14. The drive ICs 86 and 88 are electrically connected with the motors 72 and 82 in the duplex printing unit 14, respectively, so that the controller 84 can instruct the drive ICs 86 and 88 to drive the respective motors 72 and 82.

The auxiliary unit 14 also includes a paper sensor 90 for detecting a paper moving past the passage 40 and a sensor 92 for detecting that the auxiliary unit 14 has been attached to the main unit 12. Outputs of these sensors 90 and 92 are transmitted to the controller 84. The main unit 12 on the other hand includes a discharge sensor 94 disposed at a location downstream of the fixing station with respect to the direction of movement of the copying paper. This discharge sensor 94 supplies its output to the controller 84.

(2) Operation of System

Figure 7:
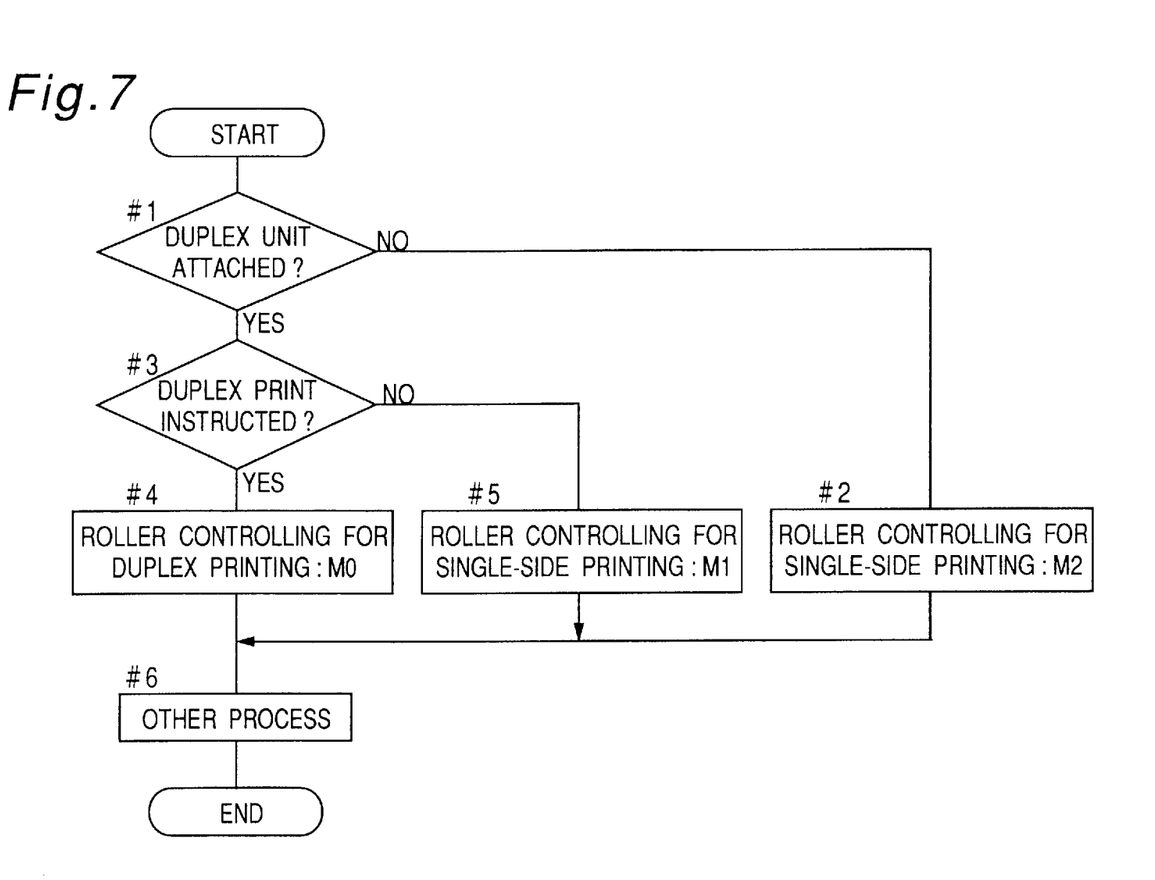
FIG. 7 is a main flowchart of processes carried out by a controller shown in FIG. 6.

Referring to FIG. 7 showing the sequence of operation of the system, at step #1 the controller 84 determines in reference to the output of the sensor 92 whether the duplex printing unit 14 has been attached to the main unit 12. If the duplex printing unit 14 has not yet been attached, a program flow jumps to a step #2 where the controller 84 performs a roller control for a single-side printing M2. When the duplex printing unit 14 has been attached to the main unit 12, the controller 84 judges at step #3 whether the duplex printing has been instructed. If the duplex printing is instructed, the controller 84 performs a roller control for duplex printing M0 at step #4, or otherwise, the controller 84 performs a roller control for a single-side printing M1 at step #6. After any one of the steps #2, #4 and #5, the controller 84 performs other process such as an image forming process at step #6.

(2-1) Roller Control for Duplex Printing M0

Figure 8:
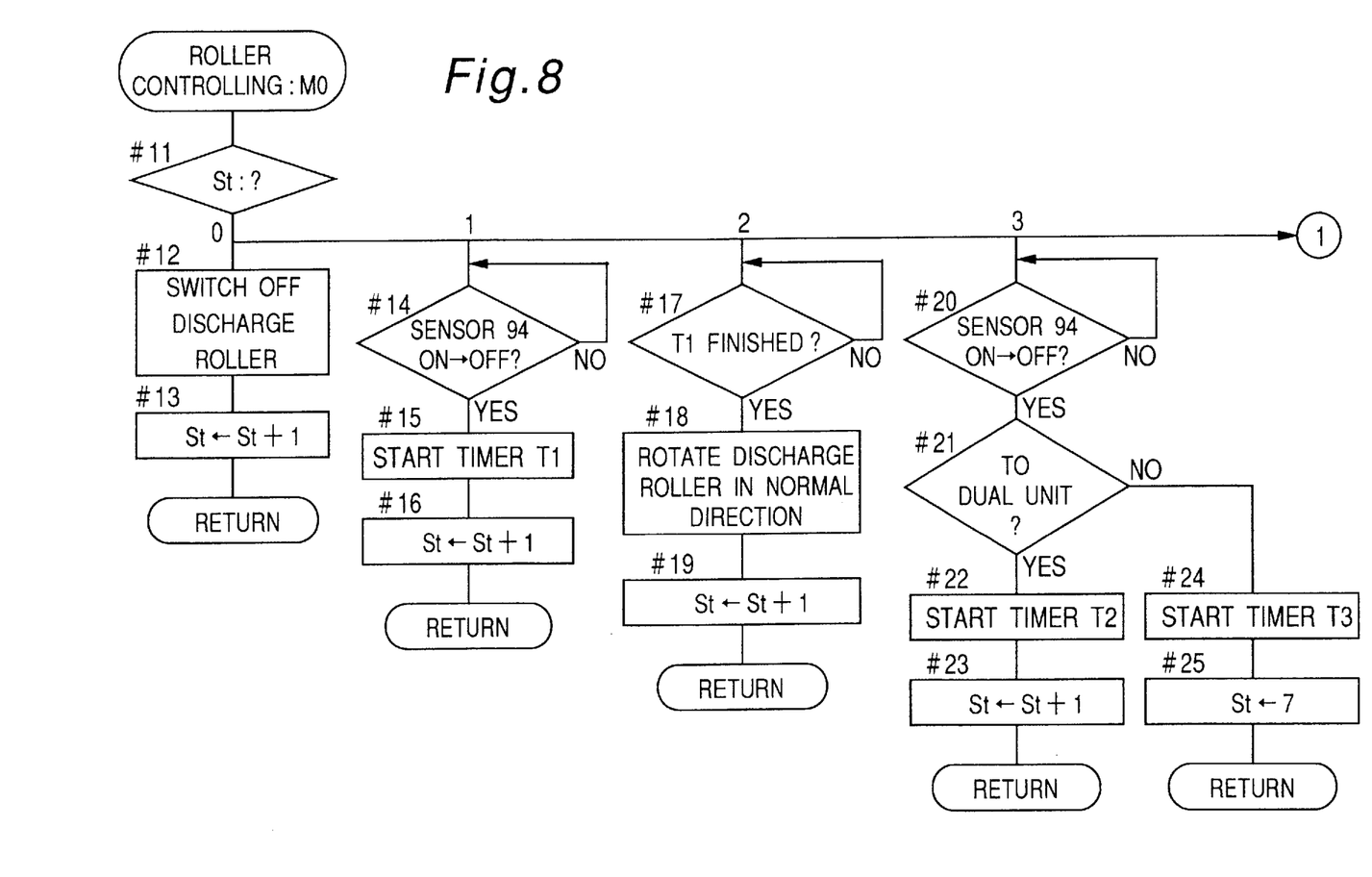
FIG. 8 is a flowchart showing processes of a discharge roller controlling at duplex printing.
Figure 9:
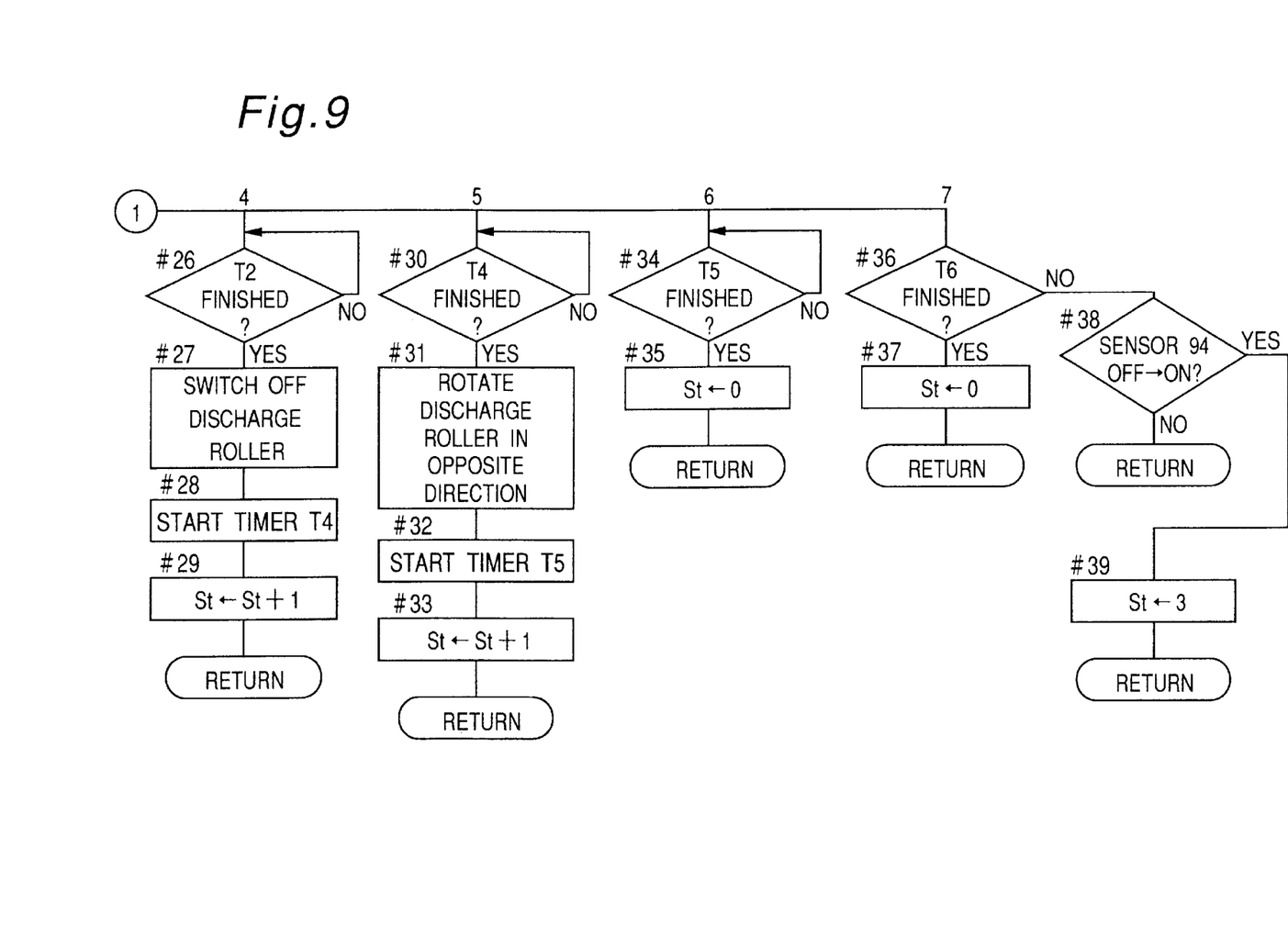
FIG. 9 is also a flowchart of a discharge roller controlling at duplex printing, carried out subsequent to FIG. 8.

Referring to FIGS. 8 and 9, in the roller control M0 for the duplex printing, at step #11 the controller determines the number of a status indicative of what steps to be processed subsequently during this control. In other words, when the status is "0" indicating that the printer has been initialized, the discharge roller 36 is switched off at step #12 and then the status is incremented to "1" at step #13.

When the status is "1", determination is made at step #14 of whether the sensor 94 is switched from an OFF state to an ON state as a result of detection of the paper in the main unit 12. If the sensor 94 is not switched over to the ON state, the program waits until the paper is detected by the sensor 94. When the sensor 94 detects a leading end of the paper which has passed the fixing station, a timer T1 is started at step #15. This timer T1 has a preset time shorter than the length of time required for the paper fed past the sensor 94 to reach the discharge roller 36. Then the status is incremented to "2" at step #16.

When the status is "2", a decision step #17 takes place to determine whether the timer T1 has finished. If the timer T1 has finished, the controller 84 starts driving the discharge motor 72 and thereby rotating the discharge roller, in a normal direction indicated by the arrow in FIG. 1 at step #18, permitting the paper to be transported towards the catch tray 38. Then, the status is incremented to "3" at step #19.

When the status is "3", determination is made at step #20 of whether the sensor 94 is switched off, i.e., whether a trailing end of the copying paper has moved past the sensor 94. If the paper has moved completely past the sensor 94, another decision is made at step #21 to determine if the paper should be discharged into the duplex printing unit 14 or to the catch tray 38. At this time, if only one side of the paper has been printed, the controller starts a timer T2 at step #21 and then increments the status to "4" at step #23, but if both sides of the paper have to be printed, the controller starts a timer T3 at step #24 and then increments the status to "7" at step #25.

When the status is "4", i.e., only one side of the paper is printed, determination is made at step #26 of whether the timer T2 has finished. If the timer T2 has finished, the controller 84 switches off the motor 72 rotating in the normal direction at step #27. This timer T2 has a preset time equal to the length of time required for the trailing end of the paper to move from the sensor 94 to the passage 26. Then a timer T4 is started at step #28 and the status is incremented to "5" at step #29.

When the status is "5", it is determined at step #30 whether the timer T4 has finished. If the timer T4 has finished, the motor 72 for discharging the paper is rotated in a negative direction opposite to the positive direction so that the paper can be reversed towards the duplex printing unit 14 at step #31. Then the controller 84 starts a timer T5 at step #32 and then increments the status to "6" at step #33.

When the status is "6", determination is made at step #34 of whether the timer T5 has finished. If the timer T5 has finished, the controller changes the status to "0" at step #35. Thereby, the paper is transported through the passage 34 in the duplex printing unit 14 to the main unit 12 again and is then provided with the second toner image onto the opposite side thereof.

When the status is "7" indicating that the paper bearing images on both sides has passed by the sensor 94, it is determined at step #36 whether the timer T3 has finished. If the timer T3 has finished, the controller changes the status to "0" at step #37. But if it has not finished yet, another decision is made at step #38 to determine if the sensor 94 has detected the next succeeding paper and is therefore turned on. Then, if the sensor 94 detects the next succeeding paper, the controller 84 changes the status to "3" at step #39.

(2-2) Roller Control for Single-Side Printing M1

Figure 10:
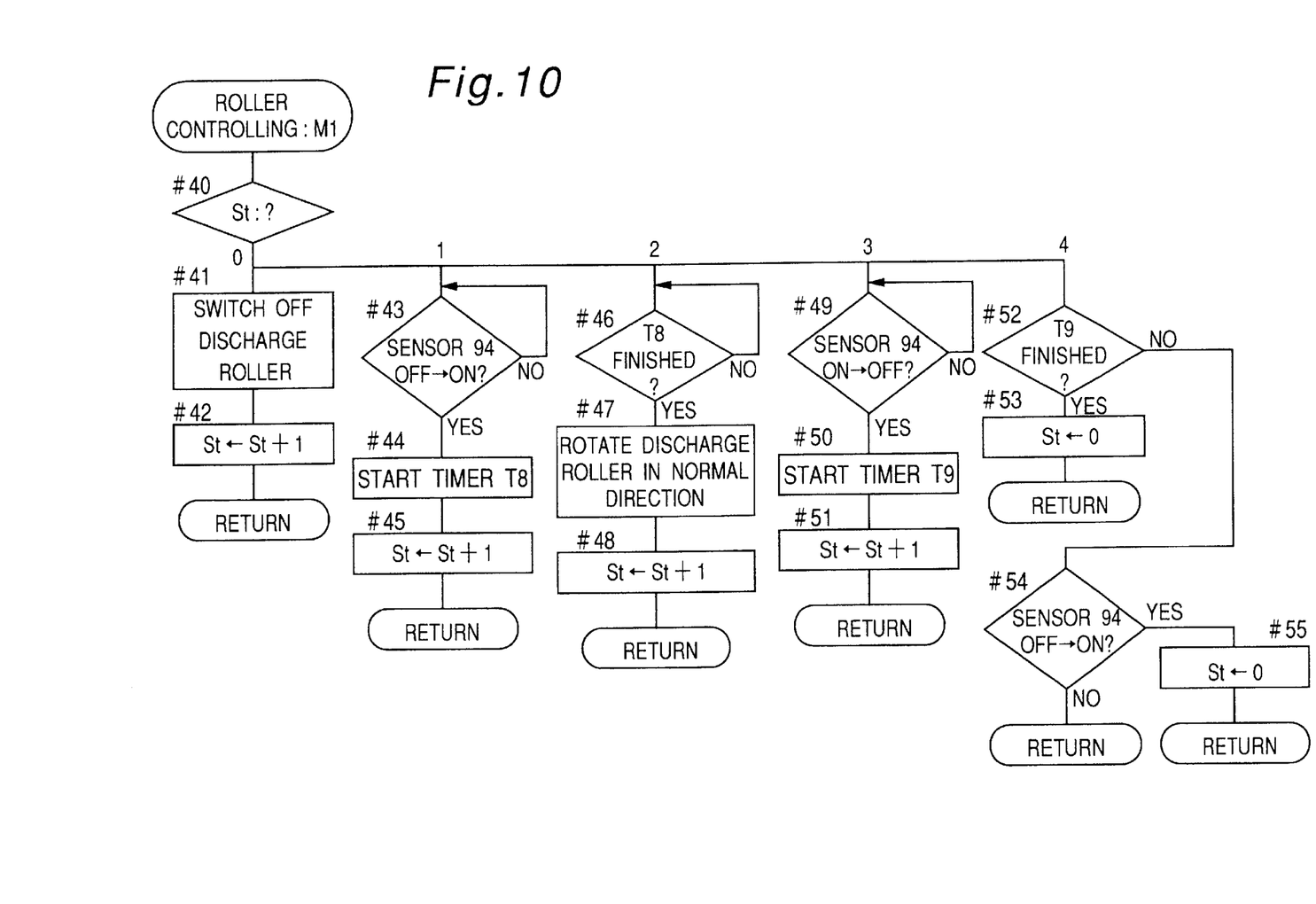
FIG. 10 is a flowchart showing processes in a discharge roller at single printing M1.

Referring to FIG. 10, in the roller control for single-side printing M1 which is carried out when the single-side printing is instructed while the duplex printing unit 14 has been attached to the main unit 12, the controller 84 reads the status (#40) and then carries out the process corresponding to the present status.

When the status is "0" indicating that the printer has been initialized, the discharge roller 36 is switched off at step #41 and then the status is incremented to "1" at step #42.

When the status is "1", determination is made at step #43 of whether the sensor 94 has detected the paper and thereby has turned on. If it has not yet been turned on, the program waits until the paper will be detected. If the paper having moved past the fixing station is detected by the sensor 94, the timer T8 is started at step #44. This timer T8 has a preset time equal to or less than the length of time required for the paper to move from the sensor 94 to the discharge roller 36. Then the controller 84 increments the status to "2" at step #45.

When the status is "2", it is determined at step #46 whether the timer T8 has finished. If the timer T8 has finished, the motor rotates in the normal direction and the paper is thereby transported towards the catch tray at step #47. Then, the controller increments the status to "3" at step #48.

When the status is "3", determination is made at step #49 of whether the sensor 94 has turned off, i.e., the trailing end of the paper has passed across the sensor 94. Then, if the sensor 94 detects the trailing end of the paper, the controller 84 starts a timer T9 at step #50 and then increments the status to "4" at step #51.

When the status is "4" indicating that the paper having an image on one side has passed by the sensor 94, it is determined at step #52 whether the timer T9 has finished. If the timer T9 has finished, the controller 84 changes the status back to "0" at step #53, or otherwise, determination is made at step #54 of whether the sensor 94 has detected the next succeeding paper and thereby has turned on. If the sensor 94 detects the paper the controller changes the status back to "0" at step #55.

(2-3) Roller Control for Single-Side Printing M1

Figure 11:
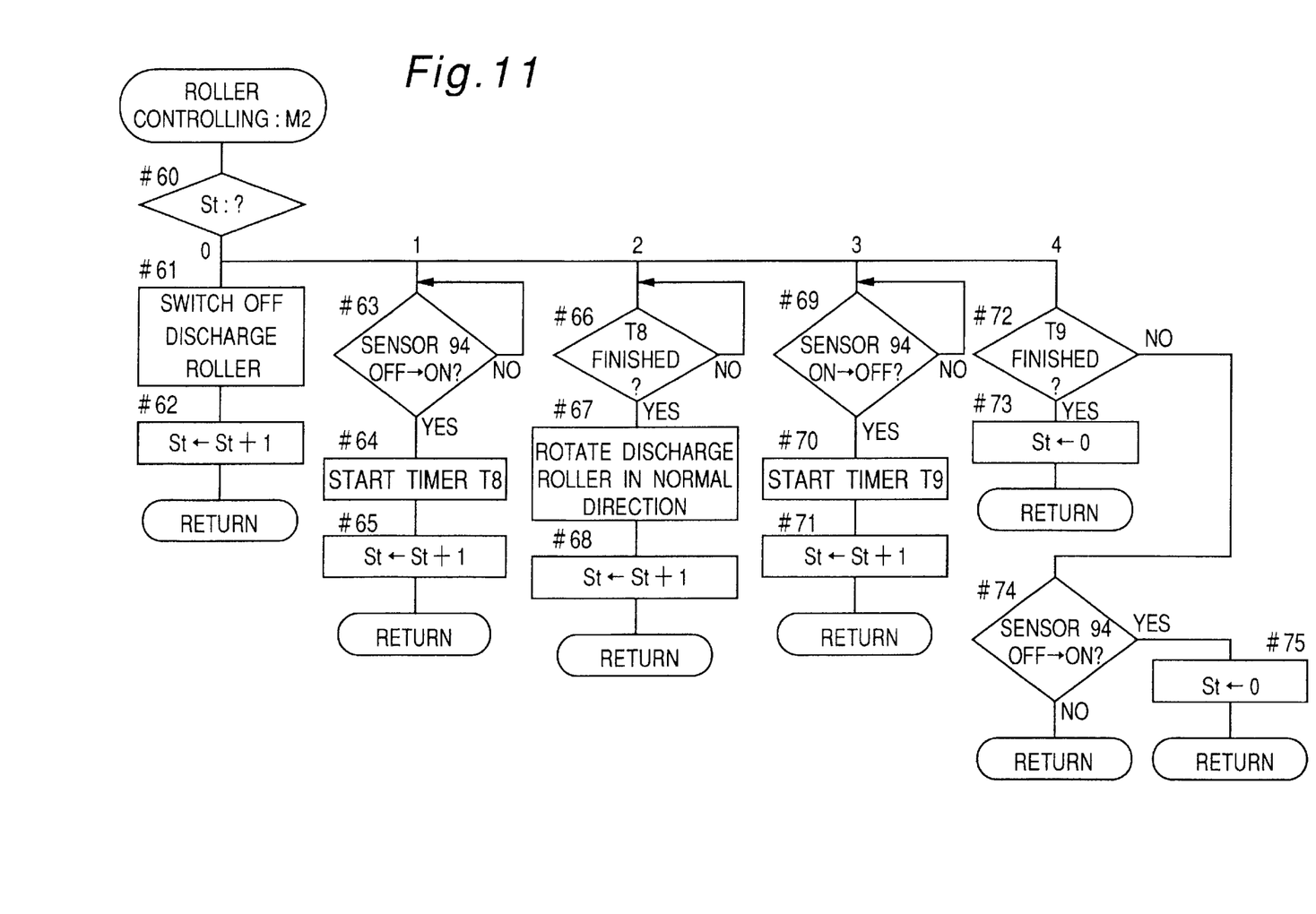
FIG. 11 is a flowchart showing processes in a discharge roller at single printing M2.

Referring to FIG. 11, in the roller control for the single-side printing M2, which is carried out when the single-side printing is instructed while the duplex printing unit 14 has been attached to the main unit 12, the controller 84 performs steps #60 to #75. These processes are the same as the above described processes #40 to #55, except that the roller 36 is rotated by the main motor 50.

(3) Modification

In the above described embodiment, the discharge motor 72 is of a reversible type so that depending on the direction of rotation thereof, the paper can be transported either to the catch tray or to the duplex printing unit. Instead, an unidirectional drive motor may be employed for the discharge motor 78, but in combination with a gear switching mechanism having two different gear positions; one position for transporting the paper in one direction and the other position for transporting the paper in the opposite direction. In this case, it is preferable to arrange the gear switching mechanism in the duplex printing unit.

Also, instead of the discharge roller 36, another roller rotatable in either direction may be arranged adjacent the passage 34 for transporting the paper into the duplex printing unit.

While this invention has been described in connection with the preferred embodiment wherein the system consists of the main unit and the duplex printing unit, it should be apparent to those skilled in the art that the invention can be applied to other combinations such as image forming machine, i.e., copier, printer, or facsimile, and automated document feeder, duplex printing unit, additional paper feeder, sorter, or other finishers.

What is claimed is:

1. An image processing system, comprising:
   (a) a main image processing unit; and
   (b) an auxiliary unit detachably attached to the main image processing unit and including a first drive source; said main image processing unit including:
      a mechanism for transporting a sheet;
      a second drive source; and
      a transmission which transmits a power from the first drive source to the sheet transporting mechanism when the auxiliary unit is attached to the main image processing unit and transmits a power from the second drive source to the sheet transporting mechanism when the auxiliary unit is not attached to the main image processing unit.

2. A system claimed in claim 1, wherein the main image processing unit further includes an image forming means for providing on one side of the sheet with an image, and the auxiliary unit further includes a sheet transporting means which receives the sheet having the first image on its first side from the main image processing unit and then transports the sheet back into the main image processing unit for providing the second side of the sheet with a second image.

3. A system claimed in claim 2, the auxiliary unit further includes a third drive source for driving the sheet transporting means.

4. A system claimed in claim 1, wherein the main image processing unit further includes a controller which outputs a signal for controlling the first drive source in the auxiliary unit.

5. A system claimed in claim 4, wherein the controller turns on and off the first drive source by the controlling signal.

6. A system claimed in claim 5, the controller instructs the first drive source to drive in a reverse direction by the controlling signal.

7. An image processing unit to which an auxiliary unit can be attached, comprising:
   a mechanism for transporting a sheet;
   a first drive source; and
   a transmission which transmits a power from the first drive source to the sheet transporting mechanism when the auxiliary unit is not attached to the image processing unit and transmits a drive power of a second power source mounted in the auxiliary unit to the sheet transporting mechanism when the auxiliary unit is attached to the image processing unit.

8. An image processing unit claimed in claim 7, further includes means for forming an image on one side of the sheet, wherein the auxiliary unit attached to the image processing unit receives the sheet having the image on the first side and then transports the sheet back into the image processing unit so as to form a second image on the other side of the sheet.

9. An image processing unit claimed in claim 7, further comprises a controller which outputs a control signal for controlling the second drive source in the auxiliary unit attached to the image processing unit.

10. An image processing unit claimed in claim 9, wherein the controller instructs the second drive source to switch on and off by the controlling signal.

11. An image processing unit claimed in claim 10, the controller instructs the second drive source to drive in a reverse direction by the controlling signal.

12. An auxiliary unit capable of being attached to an image processing unit, comprising:
   a first drive source for driving a sheet transporting mechanism in the image processing unit when the auxiliary unit is attached to the image processing unit, and
   a changeover means for drivingly disconnecting between a second drive source mounted in the image processing unit and a sheet transporting mechanism in the image processing unit and drivingly connecting between the first drive source and the sheet transporting mechanism.

13. An auxiliary unit claimed in claim 12, wherein the auxiliary unit further includes a paper transporting means which receives a sheet having a first image on its first side and then transports the sheet back into the image processing unit for providing the second side of the sheet with a second image.

14. An auxiliary unit claimed in claim 13, the auxiliary unit further includes a third drive source for driving the sheet transporting means.

15. An auxiliary unit claimed in claim 14, wherein the first drive source is controlled by a control signal from the controller mounted in the image processing unit.

16. An auxiliary unit claimed in claim 15, wherein the first drive unit is switched on and off by the controlling signal.

17. An auxiliary unit claimed in claim 16, wherein the first drive source is driven in a reverse direction by the control signal.

18. An image forming method using an image forming unit and a duplex printing unit detachably attached to the image forming unit, comprising the steps of:
   (a) when an image is to be printed on only one side of a sheet when the duplex printing unit is detached from the image forming unit:
      forming an image on the one side of the sheet in the image forming unit; and
      discharging the sheet on which the image is formed in the previous step by using a drive source in the image forming unit;
   (b) when images are to be printed on both sides of the sheet, respectively, when the duplex printing unit is attached to the image forming unit:
      feeding the sheet having an image on one side in the image forming unit to the duplex printing unit by using a power from a drive source in the duplex printing unit;
      transporting the sheet in the duplex printing unit back into the image forming unit again for printing another image on the other side of the sheet;
      forming the other image on the other side of the sheet from the duplex printing unit in the image forming unit; and
      discharging the sheet having respective images on its opposite sides by a drive source in the duplex printing unit.

19. A method claimed in claim 18, further comprises the steps of:
   when the image is to be printed on one side of the sheet when the duplex printing unit is attached to the image forming unit:
      forming the image on one side of the sheet in the image forming unit; and
      discharging the sheet having the image on one side by a drive source in the duplex printing unit.

* * * * *